Aug. 27, 1963
A. S. WINTHROP ETAL
EPOXY RESINOUS COATING COMPOSITION
AND FLUIDIZED BED COATING METHOD
Filed Aug. 10, 1959
3,102,043
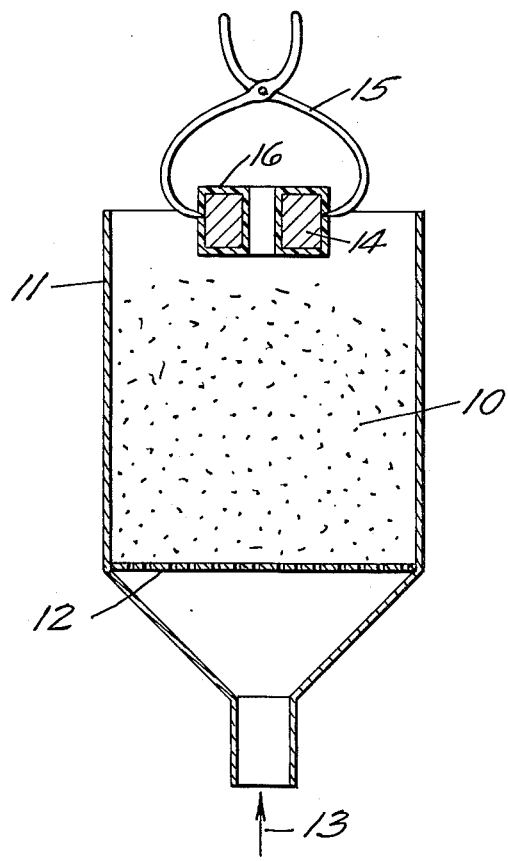
INVENTORS
ARTHUR S. WINTHROP
THADDEUS J. SKOTNICKI
BY
Carpenter, Abbott, Coulter + Kinney
ATTORNEYS United States Patent Office 3,102,043
Patented Aug. 27, 1963

3,102,043
EPOXY RESINOUS COATING COMPOSITION AND FLUIDIZED BED COATING METHOD
Arthur S. Winthrop, Los Angeles, Calif., and Thaddeus J. Skotnicki, White Bear Lake, Minn., assignors to Minnesota Mining and Manufacturing Company, St. Paul, Minn., a corporation of Delaware
Filed Aug. 10, 1959, Ser. No. 833,125
5 Claims. (Cl. 117—21)

This application is a continuation-in-part of our application Serial No. 712,119, filed January 30, 1958, now abandoned.

This invention relates to the application of tough, infusible, smooth and uniform, non-thermoplastic, solvent-resistant, protective resinous coatings to articles or workpieces, including such irregularly shaped articles as small capacitors, coils, rotor and stator assemblies, wire-bobbins, printed circuits and assemblies, screws and bolts, and various other articles.

The invention further relates to, and provides, large masses of small, brittle, storable and yet rapidly thermosetting, 1,2-epoxy particles, useful particularly in suspension coating techniques to provide the improved coatings as herein discussed, and to methods of making suitably large masses of such particles.

The suspension coating procedure for forming the coated articles hereof utilizes the principle of applying a layer of resin upon a workpiece by interposing the workpiece in a heated state in a suspension of resin particles so that the particles are deposited upon the hot workpiece in a layer. This principle is used in fluidized bed coating techniques, in spray gun coating procedures, and the like. In such coating techniques, particles of resinous composition coming in contact wtih the heated workpiece must melt or fuse, adhere to the surface, and coalesce with one another, thereby forming a coating. The principle has previously been applied to thermoplastic resinous materials, but has not, prior to the present invention, been successfully applied on a commercial scale to rapidly thermosetting 1,2-epoxy resin compositions as here discussed, at least so far as we have been able to determine.

In possible explanation, it is suggested that no one heretofore has found it possible to provide the art with 1,2-epoxy resin particles having the correct balance of required properties, and in sufficient quantity to function efficiently in suspension coating techniques. While such masses of particles must be rapidly thermosetting, they also must be temporarily thermosoftening so as to adhere to a heated workpiece satisfactorily and coalesce properly to provide a smooth uniform film. They must be of a character which permits attainment of desired uniformity of coating, and yet prevents surface tension forces, during melting or curing, from stripping the resin from high places or sharp edges of an object, thereby leaving them thinly coated or even bare. For satisfactory usage on a large commercial scale, they should be storable at room temperature and remain stable for a time even at slightly raised temperatures such as might be encountered in bulk shipments. All of these factors have apparently militated against successful bulk preparation of modified, room-temperature-storable, 1,2-epoxy resin particles; and indeed, it appears that the art has considered the necessary high and rapid reactivity for the particles as a primary stumbling block in the bulk preparation of such particles.

It is not unlikely that some consideration by the art has been given to mixtures of epoxy resin particles, curing agent particles, and other ingredients in particle form for use in fluidized bed coating procedures and the like. Such a mixture of different particles, however, suffers the disadvantage of being inherently non-uniform and, under the action of an air stream in a fluidized bed, would become even more non-uniform; thus desired uniformity and high quality of coatings would be sacrificed. On the other hand, it would ordinarily be expected that the intense interreactivity of various essential ingredients would cause uncontrolled interreaction during conventional attempts to melt and stir the materials together for blending, rather than the successful preparation of a homogeneous mass capable of reduction to particles of the desired post-cure and other characteristics.

Thus, insofar as we are aware, the art was devoid, prior to our invention, of bulk masses of small modified 1,2-epoxy resin particles which possess the necessary balance of characteristics and properties for convenient commercial handling, and successful commercial usage in fluidized bed coating techniques and analogous suspension coating procedures.

This invention, however, provides the art with such new conveniently handled epoxy resin particles which have properties satisfying the requirements for successful commercial use in suspension coating techniques. It has been found that large quantities of highly reactive blends, including a 1,2-epoxy resin and such active curing agents or hardeners as, for example, chlorendic anhydride, may be formed so as to be essentially homogeneous, and then reduced to the desired particulate form while still retaining adequate temporary heat softening and thermosetting properties, as well as other required characteristics. Although some reaction may possibly occur, the powdered material is still capable of melting or fusing in contact with properly heated workpieces, and the particles are capable of actually coalescing and flowing together on such workpieces to provide on curing a well bonded and well unified coated layer. The layer thus formed does not flow out of place, but remains in position on the heated workpiece, even when subjected, if necessary, to substantially higher temperatures during the curing operations.

The drawing made a part hereof illustrates schematically the coating of an irregularly shaped heated workpiece with a uniform layer of coalesced resinous particles from a fluidized bed of resin particles. The particles 10 are suspended within a container 11 having a porous false bottom 12 by means of an air blast 13 entering at a velocity just sufficient to suspend the particles within the container in a uniform fluidized bed. A preheated workpiece 14 properly suspended as by tongs 15, or by other means, is held within the fluidized bed of resinous particles to collect on the surface of the workpiece a desired thickness of coalesced particles, here indicated as layer 16. The piece is then withdrawn and may, if desired, be placed in an oven for further and essentially complete curing of the resinous coating to a tough, infusible state.

In a preliminary experiment, a very small amount of 1,2-epoxy resin ("Epon 1001") was heated to 250° F. and powdered chlorendic anhydride was stirred therein, followed immediately by cooling the mixture rapidly to room temperature. The anhydride appeared to dissolve in the resin, and the cooled product appeared homogeneous. Reduced to powder form, it was successfully employed in a fluidized bed coating procedure. However, the batch size for this experiment was restricted to somewhat less than one pint, which is much below that required for satisfactory commercial operation, since charring occurred at the center portions of larger batches, even when rapidly cooled with Dry Ice. Also, in the case of powders made from larger batches using this technique, "black spots" or charred spots were in evidence on workpieces coated with a layer of the cured particles.

A procedure which is capable of producing highly heat-reactive epoxy resin particles in large quantities on a commercial scale, as required, is now offered. The epoxy resin, chlorendic anhydride or other epoxy-reactive hardener and further catalysts when desired, are combined by blending in a steam heated heavy duty internal mixer, such as a Mogul mixer commonly used in rubber blending, or by milling to a semi-fluid mass on heated steel rolls, for example on a rubber mill. With the Mogul or mill still in operation, the mixture is rapidly cooled and the resinous mass thereby solidified or converted to a solid condition. It is then removed either by scraping or flaking. At this point it is found that the material appears to be a fused homogeneous mass, yet reaction has been sufficiently inhibited so that the resulting product is still rapidly heat-curable, but remains stable when reduced to particulate form and stored at room temperature.

The lumps of resin are reduced by crushing and are screened to provide a particulate mass having a particle size of about 40-325 mesh, preferably about 120-170 mesh, capable of passing through a screen of 40 mesh. Particles are desired for masses having the specific composition and density of Example 1. Standard Tyler screens are used in determining the mesh size. The particles thus produced are homogeneous and provide excellent results in the fluidized bed coating process. They comprise interreactive blends which cure on heating to provide tough infusible masses or coatings, as required.

*Example 1*

The formula of this example is typical of those which have given good results in bulk manufacture when combined and further treated as just indicated. The formula consists of 500 parts by weight of "Epon 1001" epoxy resin (about 1.03 reaction equivalents), 368 parts by weight of chlorendic anhydride (about 0.945 reaction equivalent), and 1%, i.e., 8.8 parts by weight of dimethyldioctadecyl ammonium bentonite ("Bentone 34"). The ingredients are milled to a semi-fluid blended mass in about 6 minutes on a rubber mill, the steel rolls of which are heated by steam and water to about 150° F. Cold water is then quickly introduced into the steel rolls with the mill still running. The cooled blended mixture is a solid and is stripped off the rolls in relatively thin sheets. The sheets are ground in a hammer mill into particles, and the portion having a particle size of about 120-170 mesh is employed for fluidized bed coating. Any remainder may be recombined with subsequent batches.

The particles of modified epoxy resin so formed are normally solid and brittle at room temperature. They need not be refrigerated to preserve their latent curing properties, and may be stored indefinitely at room temperatures. They can withstand temperatures as high as about 140° F. for at least about 3 weeks without fusing or melting together; thus, they may be shipped to users without refrigeration, and without other especial precautions to avoid most normally encountered increases in temperature during shipment. In addition, when they are used in suspension coating techniques, they adhere readily to heated workpieces such as cleaned capacitors and the like. Upon contact with the heated workpiece, they readily melt and flow to a slight extent, coalescing to form a uniform film as desired, but do not run off the workpiece or drip therefrom. Within about 6 minutes after placing an article coated with a layer of these coalesced particles in an oven at 300° F., the coated film gels to a non-flowable state, and within 10 minutes after being placed in the oven at 300° F. it substantially fully cures to a tough, non-brittle, non-flaking, infusible layer. We have encountered no problems with respect to oven drippings.

The flow characteristics of thermosetting epoxy resin particles suitable for use in suspension coating techniques is critical in that a certain degree of flow or fusion is vital in order to obtain coalescence of the particles into a smooth uniform coating, but a high degree of flow is to be avoided where the inherent advantages of suspension coating, such as fluidized bed coating, are to be realized. For example, one of the main advantages of fluidized bed coating is considered to be that of providing a uniform layer over all portions, including the sharp edges of irregularly shaped articles, whereas dip coating techniques have usually suffered in this respect since surface tension forces frequently tend to pull the dip-applied coating away from sharp edges leaving them either sparsely coated or entirely bare. With respect to thermoplastic resin particles, the problems of flow-out, surface tension, etc., can readily be controlled in fluidized bed coating by varying the temperature of the workpiece to be coated according to the thermoplastic properties of the particles employed. Where a heat cure is required, as in the case of the thermosetting epoxy resin particles of this invention, such a simple expedient is not always available to form tough infusible coatings of the desired type, since the coatings necessarily must be heated to a temperature above the initial flow or thermoplastic properties of the particles themselves in order to gain the desired smoothness of coating and the desired toughness and infusibility characteristics. While high pre-heat temperatures for the article to be coated may be employed so as to cause the thermosetting particles hereof to be elevated rapidly through their fusion temperature range up to temperatures at which the material cures, such an expedient is not always available, as in cases where the article to be coated must not be itself raised to curing temperatures for any deleterious length of time. It is necessary, therefore, that epoxy resin particles of this invention exhibit inherent controlled flow and coalescing properties, in addition to their required rapidly thermosetting properties.

A test has been devised to establish the approximate limits required for flow and is as follows: A 3.0 gram sample of epoxy resin powder is pressed into a small disc or wafer having an approximate thickness of ⅛ inch and a diameter of 1⅛ inches. The wafer is then placed upon a smooth, polytetrafluoroethylene-coated, flat steel panel, the panel being at 300° F. and being located in an oven maintained at 300° F. The panel is inclined at an angle of 60° to the horizontal. The bottom of the wafer melts almost instantaneously on contact with the panel and the wafer therefore sticks to the coated panel. The assembly is heated in the oven until the resin, which at first melts or fuses and flows down along the panel, is reacted to a point at which flow ceases. The distance from the top of the wafer to the lower end of the portion which flowed out is then measured and is the "flowout" factor. Fusible epoxy resin products which under these conditions exhibit a flowout factor on the order of at least about 1¼ and up to about 5 inches, preferably no more than up to about 2½ inches, are found to provide essentially uniform continuous modified epoxy resin coatings on heated workpieces using suspension coating processes. Epoxy resin particles exhibiting no flow or fusion properties result in discontinuous or non-uniform coatings, while those having a flowout factor above 5 inches are generally unsatisfactory and show a tendency to be withdrawn by surface tension or the like from high places or sharp edges of a workpiece during heat-curing.

The product of this example showed a flowout factor of about 2 inches to 2⅛ inches.

*Example 2*

The formula and procedure of Example 1 are employed, except that the dimethyl dioctadecyl ammonium bentonite is omitted, and approximately 11.2 parts by weight of diethylaminopropylphthalimide is blended with the mass on the rubber mill near termination of the blending procedure.

The blended particles of this example coalesced upon a workpiece heated to 300° F., and within seconds thereafter gelled to a non-flowable state. Within a couple minutes at 300° F., a coalesced film of these particles cured to a tough non-brittle non-flaking infusible layer, with a gel fraction of about 0.70. After 12 minutes at 300° F., the gel fraction increased to about 0.98 which, as a practical matter, indicates complete curing of the mass. A workpiece heated to approximately 400° F. contains sufficient heat to cause particles of this example to adhere upon its surface, coalesce into a film, gel to a non-flowable state, and cure to a tough, non-brittle, non-flaking, infusible layer within seconds after application. Despite the rapidity of the cure of the particles of this example, they remain stable at room temperature and at temperatures up to around 140° F. for up to about three weeks. The flowout of these fusible particles, as measured by the flowout test above described, is almost indistinguishable; their flowout factor is only on the order of 1¼ inches, or slightly less. Curing takes place so rapidly that flowout according to the test does not become evident except on close inspection, yet the particles coalesce or fuse into a smooth film prior to curing.

*Example 3*

Another mass of modified epoxy resin particles having the required properties for use in fluidized bed coating and other suspension coating techniques was formed from the following ingredients, parts being given by weight: 2000 parts "Epon 1004" (about 4.75 reaction equivalents), 160 parts isophthalyl dihydrazide (about 4.95 reaction equivalents), 20 parts of a boron trifluoride-ethyl amine complex ("BF3-400," a curing accelerator for mixtures of epoxy resin and dihydrazide hardener), 96 parts of iron oxide pigment, 45 parts of a finely divided mica filler, and 15 parts of dimethyldioctadecyl ammonium bentonite. The epoxy resin ("Epon 1004") was charged on to a two-roll rubber mill having its rolls tightly set, one roll being heated by steam to about 150–180° F. and the other roll being cooled with cold water. It was milled on this rubber mill for about 5 minutes. All of the other ingredients were then charged and blended with the resin on the mill for about 15 minutes, using a scraper to remove material from the hot roll and re-charge it to the nip of the rolls. (The material tends to band on the hot roll, and better blending is achieved by scraping it therefrom and re-charging it to the nip.) The mass was then removed and quickly divided into small pigs and allowed to cool. The pigs were friable and were carefully ground to gain particles of a size within the range of about 120–170 mesh. Fines were removed by screening.

This mass of particles was stable at room temperature and could withstand 140° F. for about 3 weeks without coalescing. At about 150° F. the particles exhibited some tendency to coalesce together. The product showed a flowout of about 1⅞ inches according to the flowout test aforedescribed. Applied as a layer by fluidized bed coating, these particles gelled to a non-flowable state within 5 minutes after being placed in an oven at 300° F., and cured to a substantially fully cured, tough, non-brittle, infusible layer within about 10 minutes after being placed in oven.

*Example 4*

295.7 parts of "Epon 1001" and 295.7 parts of "Epon 1002" are softened and banded on a two-roll rubber mill at a minimum elevated temperature, e.g. about 180° F. Then 2.3 parts of tris(dimethylaminomethyl) phenol, a catalyst for reaction between epoxy resin and epoxy-reactive hardeners therefor, are blended in the mass of resin on the mill. Next about 5.3 parts of alkyl ammonium bentonite ("Bentone 38," a filler-catalyst material), about 350 parts of finely divided mica filler, and about 10 parts of chrome oxide pigment are added and mixing continued on a two-roll rubber mill until a blend is obtained. About 51 parts of isophthalyl dihydrazide hardener (melts at about 420° F.) are then added slowly to the mill and blended with the other ingredients. Then 10 parts of dicyandiamide, which serves as a hardener for epoxy resins as well as a catalyst for reaction between other hardeners and epoxy resins, are added and blended in the mass on the mill. The total time on the rubber mill for forming this mixture should not exceed about 23 minutes. The foregoing is accomplished as rapidly as possible so as to minimize the tendency for any reaction between the components. After about 23 minutes on the mill, Dry Ice is added to lower the temperature of the composition; and it is then sheeted off, further cooled and ground to a fine particle size using, for example, a corn mill. Particles passing through a screen of 40 mesh and retained upon a screen of about 200 mesh are eminently suited for use in suspension coating techniques.

The particles of this composition melt or soften at about 300° F. and within seconds after fusing or coalescing at this temperature, the mass gels. Within a few minutes after exposure to 300° F., curing of the fused particle mass to an infusible state is obtained. At 450° F., the particles of this composition melt, fuse, and cure to a thermoset infusible state within seconds. The particles, however, are stable under normal room temperature conditions and are even able to withstand approximately 140° F. for up to about three weeks without significant coalescence. Any slight coalescence of the particles was easily broken by stirring the mass. At about 120° F., these particles remained non-coalesced and free flowing even after 6 to 7 weeks in a specific test, and thus are capable of being shipped or stored without refrigeration as required. The flowout factor of the mass of particles of this example is about 1½ to 2 inches.

*Example 5*

While less preferred, this example illustrates a further variation of the composition and structural characteristics for particles suitable for use in suspension coating techniques. The particles of this example may be prepared as follows: Melt 154 parts of "Epon 1004" at 300° F. and 74 parts of phthalic anhydride at 300° F. in separate containers. When both materials are melted to limpid liquids, mix them together while vigorously stirring. Immediately thereafter pour the mass into a cool shallow pan where it solidifies to a brittle solid. The cooled mass appears white or opaque. Mill the mass in a ball mill until a predominance of particles in the range of about 40 to 200 mesh are obtained, up to about 16 hours of milling being sufficient. Then add to the material in the ball mill a quantity of liquid 2,4,6-tri-(dimethyl-amino-methyl) phenol, the quantity being about 8⅓% by weight based on the weight of the epoxy and anhydride. Continue milling for about 30 minutes longer. Then screen the particles to obtain those in the range of about 120 to 170 mesh for fluidized bed use.

The particles resulting contain a uniform blend of the epoxy resin and a hardener for the epoxy resin, with a surface coating of a curing accelerator, i.e., the tertiary amine added in the ball milling step.

Used in fluidized bed coating as aforedescribed, these particles adhered satisfactorily to a preheated steel workpiece at 250° F. with substantially no running or dripping. The particles gelled on the steel piece in about 7 minutes after being placed in an oven at 300° F. Prior to gelling, they flowed on contact with the steel piece, but their flowout was only about 2¼ inches as measured by the aforenoted flowout test. In about 10 minutes at 300° F., the film applied by fluidized bed was cured to a tough, non-brittle, infusible state. When these particles were used and cured under carefully controlled conditions, coatings free of "black spots," and burned areas were obtained. These particles are stable up to about 140° F. and may be shipped without especial protection from the temperatures normally encountered in shipment.

Dihydrazide hardeners for epoxy resins, and particularly isophthalyl dihydrazides as illustrated, are now known as latent heat-activatible epoxy-reactive materials. They are particularly useful to employ in forming the autogenous heat-curable particles of this invention. Dihydrazide hardeners and the reaction between epoxy resins and dihydrazide hardeners, are described in Wear U.S. Patent No. 2,847,395, here incorporated by reference. Dihydrazides are conveniently handled in forming the masses of particles as here taught, and function admirably, as does also chlorendic anhydride, to impart required latent moderate-temperature rapid-curing characteristics to epoxy resin particles of this invention. The reaction between epoxy resins and chlorendic anhydride is described in Rudoff Patent No. 2,744,845, also here incorporated by reference. Other latent curing agents or hardeners such as, for example, phthalic anhydride, may be employed as illustrated, even though the reactivity with epoxy resins is slower, and therefore, even though it would be expected that they could not function suitably in a system having the combination of properties here described.

Hardeners selected for blending as described are employed with epoxy resins in amounts sufficient to give an interreactive blend of the epoxy resin and latent epoxy-reactive hardening agent. As illustrated in the examples, the equivalents of epoxy resin and epoxy-reactive hardener are preferably maintained approximately equal; but it is possible to form interreactive blends which cure to a thermoset infusible condition by varying the equivalents of hardener rather significantly from a single equivalent for each equivalent of epoxide in the epoxy resin (e.g. by using from 0.5 to 3 or even 4 equivalents of hardener per equivalent of epoxy). The amount of hardener suitable to employ with a certain quantity of epoxy resin to gain an interreactive blend forms no part of the novel teaching of the instant invention. The concept is discussed in the prior art patents here incorporated by reference and will be noted to be a variable concept inasmuch as the reactive groups or functional groups of various hardeners are different, and the reaction of all reactive groups of a hardener is not always relied upon to gain satisfactorily complete interreaction between the hardener and epoxy resin to provide a thermoset infusible mass. For example, only one of the two reactive groups on an anhydride may be employed in reaction between an epoxy resin and an anhydride, or only two or three of the four terminal hydrogens in a dihydrazide may be reacted with epoxy groups to effect cross-linking of the resin blend to an infusible state. In view of the complexity of reaction and the technical variations of reaction between various hardeners and epoxy resins, we have chosen to characterize the quantity of ingredients in the blend as being sufficient to provide an interreactive blend, capable of curing to a thermoset infusible state (i.e. that the blend contains sufficient hardener and epoxy for reaction on heating to a thermoset infusible state).

For rapid curing as described, it is sometimes desirable to employ curing accelerators or catalysts, e.g., a tertiary amine, etc., in catalytic quantities as illustrated. From the standpoint of easy avoidance of "black spots" or charred pinpoints in a final coating, it is much preferred to blend these accelerators with the epoxy resin and its hardener so that each particle contains an essentially uniform blend of the ingredients. Suitable curing accelerators or catalysts include those of the amine-type, particularly tertiary amines and their acid salts. In addition to accelerator mentioned above, others which are illustrative are alpha methylbenzyldimethylamine, acid salts of tris(dimethylaminomethyl) phenol, diethylaminopropylphthalimide, salicylic acid salts thereof, etc.

Fillers such as mica, asbestos fines, alkyl ammonium bentonites, etc., are employed advantageously for the inhibition to excessive flow which they impart to the articles. It is possible that fillers such as alkyl ammonium bentonites also beneficially serve to some extent as curing accelerators in the blended mixtures. In some cases, pigments may be employed in sufficient quantity to function as fillers. Filler content may vary from about 0.5% by weight of the composition, as where an alkyl ammonium bentonite, or equivalent, is employed and worked into the composition by mechanical milling, up to as high as about 30% by weight of the composition, or even more, say 60% by weight of the composition. Usually higher filler contents are employed where mica or the like is used, but as illustrated in Example 5, it is not always necessary to employ fillers, particularly where, as in Examples 2 and 4 as well as 5, extremely rapid composite curing mechanisms are employed.

Plasticizers, pigments, colorants and other additives may be included for specific physical properties, for economy, or for other reasons.

Epoxy resins are well known and are noted generally to consist of the reaction products of Bisphenol A and epichlorhydrin, the reaction being carried out under alkaline conditions. "Epon 1001" is one such resin and contains a molar ratio of epichlorhydrin to Bisphenol A of about 1.8. It has a Durrans' mercury method melting point of about 70° C. Another such resin is "Epon 1004," which has a molar ratio of epichlorhydrin to Bisphenol A of about 1.22 and a melting point of about 100° C. "Epon 1002" also is a resin of this type, having a Durrans' mercury method melting range of 75–85° C. These epoxy resins, sometimes considered resinous polyethers, have more than one 1,2-epoxy group

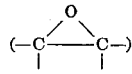

per average molecular weight of resin. Analogous results of this invention may be obtained with other normally-solid epoxy resins as produced by the reaction of epichlorhydrin or equivalent 1,2-epoxy compound with polyhydric phenols or other polyhydric compounds such as polyhydric alcohols. Also, epoxy resins may be produced by epoxidizing double bonds of unsaturated hydrocarbons, as is well known. In all cases, the epoxy resin has, on the average, more than one 1,2-epoxy linkage or oxirane oxygen group per molecule.

The processes and particles of this invention, as here described, have been found particularly valuable in conjunction with protectively and insulatively coating small and irregularly shaped electrical articles such as ceramic disc capacitors. Frequently these capacitors are prepared so as to be unable to withstand temperatures above about 350° F. because of the soldering employed for connections, yet it is desired to encase them with a uniform sheath of infusible epoxy resin. Particles of this invention are admirably suited to this use. As one example, such capacitors having a diameter of ½ inch are preheated to 300 F., coated with the epoxy resin base formulation of Example 1 by the fluidized bed process, and cured in an oven for about 10 minutes at 300° F., to provide a fully cured and highly-resistant insoluble resinous coating. For items of such small size, additional coatings may be desired; and the capacitors indicated are greatly improved by being provided with a second coating, the dielectric strength thus imparted to the capacitors reaching a value of at least about 4500 volts D.C. under such treatment.

There has thus been made available a novel procedure for providing heat-resistant and solvent-resistant cured continuous resinous coatings of uniform thickness, employing novel rapidly heat-curing epoxy resinous compositions in particulate form having the ability to fuse and coalesce at heated surfaces without flowing from corners and high points of such surfaces during subsequent heat cure. Methods for producing such novel resinous products in commercial bulk quantities are also provided.

That which is claimed is:

1. As a new article of manufacture: bulk quantities of small, discrete, normally-solid and brittle, storable and yet rapidly thermosetting, modified epoxy resin particles having a size within the range of about 40 to 325 mesh, said particles being suitable for application by suspension coating techniques to heated workpieces to provide a fused well bonded smooth coating thereon, and being stable at room temperature and non-fusible at temperatures as high as about 140° F. sustained for up to about three weeks but being temporarily fusible to form a smooth mass at temperatures on the order of 300° F. with a flowout factor of at least about 1¼ inches and no more than 5 inches, and further being capable of gelling to a non-flowable state at least within about 7 minutes after being heated at 300° F., and capable of advancing to a cured infusible state within about 10 minutes after being heated at 300° F., each of said particles comprising a fusible interreactive blend of a 1,2-epoxy resin averaging more than one 1,2-epoxy group per molecule with a melting point above 140° F. and a latent room-temperature-solid heat-activatable epoxy-reactive acid anhydride hardening agent, and including sufficient latent amine-type heat-activatable catalytic accelerator to substantially effect interreaction between said epoxy resin and said latent hardening agent within 10 minutes at 300° F., and sufficient flow-inhibiting filler, up to 60% by weight of the total composition of said particles, to limit the flowout factor of said composition within the range of at least about 1¼ inches up to no more than 5 inches.

2. As a new article of manufacture: bulk quantities of small, discrete, normally-solid and brittle, storable and yet rapidly heat-fusible and thermosetting, modified epoxy resin particles having a size within the range of about 40 to 325 mesh, said particles being suitable for application by suspension coating techniques to heated workpieces to provide a fused well bonded smooth coating thereon, and being stable at room temperature and having a flowout factor at 300° F. of at least about 1¼ inches and no more than 5 inches, and further being capable of gelling to a non-flowable state at least within about 7 minutes after being heated at 300° F., and capable of advancing to a cured infusible state within about 10 minutes after being heated at 300° F., each of said particles comprising an essentially homogeneous fusible blend of a room-temperature-solid 1,2-epoxy resin averaging more than one 1,2-epoxy group per molecule and a latent room-temperature-solid heat-activatable amine-catalyzed epoxy-reactive hardening agent, the outer portion of said particles containing a latent amine-type heat-activatable catalytic accelerator for increasing the rate of reaction between said hardener and epoxy resin, said accelerator being present in an amount to substantially effect the reaction between said epoxy resin and latent hardening agent within 10 minutes at 300° F.

3. As a new article of manufacture: a mass of small, discrete, normally-solid and brittle, storable and yet rapidly heat-fusible and thermosetting, modified epoxy resin particles having a size within the range of about 40 to 325 mesh, said particles being suitable for application by suspension coating techniques to heated workpieces to provide a fused well bonded smooth coating thereon, each of said particles comprising a uniform fusible blend of a 1,2-epoxy resin averaging more than one 1,2-epoxy group per molecule with a melting point above 140° F., a latent room-temperature-solid heat-activatible amine-catalyzed epoxy-reactive hardening agent, a latent amine-type heat-activatable catalytic accelerator for increasing the rate of reaction between said resin and hardening agent, and a finely divided flow-inhibiting filler, said epoxy resin and hardening agent being present in mutually interreactive proportions to give a thermoset infusible product on heating, said accelerator being present in sufficient amount to substantially effect the reaction between said epoxy resin and hardener wthin 10 minutes at 300° F. and said flow-inhibiting filler being present in an amount, up to 60% by weight of the composition of said particles, to limit the flowout factor of said composition within the range of at least about 1¼ inches up to no more than 5 inches, said mass of particles being non-fusible at temperatures as high as about 140° F. and being capable of fusing and advancing to a cured infusible state at least within 10 minutes at 300° F., with a flowout factor of at least about 1¼ inches and no more than 5 inches.

4. The method of providing a workpiece with a thermoset infusible modified epoxy resin coating of essentially uniform thickness even over corners and high points on said workpiece, comprising (1) suspending said workpiece in a dense atmosphere of the modified epoxy resin particles of claim 3 while said workpiece is in a preheated condition at an elevated temperature of at least 300° F., said elevated temperature and said workpiece being such that said workpiece contains sufficient heat to cause adherence, fusion and curing of said epoxy resin particles as a coating upon surfaces of said workpiece within 10 minutes, said workpiece being maintained in said atmosphere for a time no longer than 10 minutes but sufficient for said epoxy resin particles to adhere upon the surfaces of said workpiece, and thereafter (2) removing said workpiece from said dense atmosphere and allowing the heat of said removed workpiece to fuse and cure adhered resin on the surfaces thereof.

5. As a new article of manufacture: bulk quantities of small, discrete, normally-solid and brittle, storable and yet rapidly heat-fusible and thermosetting, modified epoxy resin particles having a size within the range of about 40 to 325 mesh, said particles being suitable for application by suspension coating techniques to heated workpieces to provide a fused well bonded smooth coating thereon, and being stable at room temperature and having a flowout factor at 300° F. of at least about 1¼ inches and no more than 2½ inches, and further being capable of gelling to a non-flowable state at least within seconds after being heated at 300° F., and capable of advancing to a cured infusible state within a couple minutes after being heated at 300° F., each of said particles comprising an essentially homogeneous fusible blend of a room-temperature-solid 1,2-epoxy resin averaging more than one 1,2-epoxy group per molecule and a latent room-temperature-solid heat-activatible amine-catalyzed epoxy-reactive hardening agent, and distributed throughout all portion of each of said particles, sufficient of a latent amine-type heat-activatible catalytic accelerator for increasing the rate of reaction between said hardener and epoxy resin such that each of the following is effected: (a) the composition of said particles gels within seconds at 300° F., (b) the curing reaction between said epoxy resin and latent hardening agent occurs within a couple of minutes at 300° F., and (c) the composition of said particles gels and the curing reaction between said epoxy resin and latent hardening agent occurs within seconds at 400° F.

References Cited in the file of this patent

UNITED STATES PATENTS

| | | |
|---|---|---|
| 2,677,622 | Schoutenden | May 4, 1954 |
| 2,768,153 | Skokal | Oct. 23, 1956 |
| 2,779,668 | Daniels et al. | Jan. 29, 1957 |
| 2,786,006 | Ferverda | Mar. 19, 1957 |
| 2,786,794 | Gams et al. | Mar. 26, 1957 |
| 2,801,229 | De Hoff et al. | July 30, 1957 |
| 2,839,495 | Carey | June 17, 1958 |
| 2,844,489 | Gemmer | July 22, 1958 |
| 2,847,395 | Wear | Aug. 12, 1958 |
| 2,866,768 | Bolstad | Dec. 30, 1958 |
| 2,890,204 | Delmonte | June 9, 1959 |
| 2,921,050 | Belanger | Jan. 12, 1960 |
| 2,981,631 | Nagel | Apr. 25, 1961 |